(12) United States Patent
Shifman et al.

(10) Patent No.: US 10,848,327 B2
(45) Date of Patent: Nov. 24, 2020

(54) TWO BIT/CELL SRAM PUF WITH ENHANCED RELIABILITY

(71) Applicant: Birad—Research & Development Company Ltd., Ramat Gan (IL)

(72) Inventors: Yitzhak Shifman, Bet Horon (IL); Avi Miller, Ramat Gan (IL); Joseph Shor, Tel Mond (IL)

(73) Assignee: Birad—Research & Development Company Ltd., Ramat Gan (IL)

( * ) Notice: Subject to any disclaimer, the term of this patent is extended or adjusted under 35 U.S.C. 154(b) by 36 days.

(21) Appl. No.: 16/021,371

(22) Filed: Jun. 28, 2018

(65) Prior Publication Data
US 2020/0007350 A1 Jan. 2, 2020

(51) Int. Cl.
| G11C 11/00 | (2006.01) |
| H04L 9/32 | (2006.01) |
| G11C 11/412 | (2006.01) |
| G11C 11/417 | (2006.01) |
| H03K 19/003 | (2006.01) |

(52) U.S. Cl.
CPC .......... H04L 9/3278 (2013.01); G11C 11/412 (2013.01); G11C 11/417 (2013.01); H03K 19/00315 (2013.01)

(58) Field of Classification Search
CPC ... H04L 9/3278; G11C 11/412; G11C 11/417; H03K 19/00315
See application file for complete search history.

(56) References Cited

U.S. PATENT DOCUMENTS

| 5,572,460 A | 11/1996 | Lien | |
| 9,279,850 B1* | 3/2016 | Pedersen | H03K 19/003 |
| 2015/0029784 A1* | 1/2015 | Yabuuchi | G11C 11/417 |
| | | | 365/154 |
| 2015/0269989 A1* | 9/2015 | Tailliet | G11C 11/41 |
| | | | 365/185.07 |
| 2015/0270002 A1* | 9/2015 | Battista | G11C 11/418 |
| | | | 365/185.08 |
| 2019/0074984 A1* | 3/2019 | Shor | G11C 11/412 |
| 2019/0132137 A1* | 5/2019 | Zhong | H04L 9/0866 |

OTHER PUBLICATIONS

PCT Search Report and Written Opinion PCT/IB2019/055377, dated Jan. 24, 2020.
Vatajelu et al., "Towards a highly reliable SRAM-based PUFs", Proceedings of the 2016 Conference on Design, Automation & Test in Europe, Mar. 2016 pp. 273-276.

* cited by examiner

*Primary Examiner* — Toan K Le
(74) *Attorney, Agent, or Firm* — Dekel Patent Ltd.; David Klein

(57) ABSTRACT

A method for detecting unreliable bits in transistor circuitry includes adjusting a value of a variable capacitor coupled to a physical unclonable function (PUF) cell of a transistor circuit. The adjusting includes tilting the PUF cell to either a zero or one state: if the PUF cell changes its state during the tilting it is deemed unstable, and if the PUF cell does not change its state during the tilting it is deemed stable.

13 Claims, 8 Drawing Sheets

TWO BIT/CELL SRAM PUF WITH ENHANCED RELIABILITY

FIELD OF THE INVENTION

The present invention relates generally to methods for detecting unreliable bits in transistor circuitry, particularly static random-access memory (SRAM) circuitry, which may have applications in increasing security of cryptologic elements in the circuitry, such as physical unclonable functions.

BACKGROUND OF THE INVENTION

The huge amount of sensing devices found in future cars/homes/workplaces/cities require a much stricter security requirement for identification and authentication. The Internet of Things (IoT) can become the "Internet of Threats" without proper security measures. Secured communication is required for all of the sensors and sensing hubs in IoT. It is essential that during hardware communication, the two parties are capable of identifying each other through secret keys and reliable authentication protocols. Trusted environment involves authentication or identification by another party and/or secure transition of private information after the data has been encrypted by a safe algorithm. The vast majority of secured interaction requires storing a secured key inside or at the vicinity of the secured hardware. For example, in the case of mobile devices in the medium to low level security hazards, the secret key in the prior art is stored by external nonvolatile memory. Beside the cost and power drawbacks of this approach it is extremely vulnerable to security attacks.

A technique which has recently emerged is the utilization of inherent semiconductor device mismatch to facilitate physical unclonable functions (PUFs). These PUFs are used to generate digital identifiers, unique to every chip, which are not even visible to the chip manufacturer. The quality of the security depends on the inherent uniqueness and reliability/controllability of these functions. The PUF relies on intrinsic undetectable manufacturing variations in the CMOS (complementary metal-oxide semiconductor) process. These are divided into two categories: local/random mismatches and global/systematic variations, such as process/voltage supply/temperature (PVT). Random mismatches come from stochastic atomic-level variations which cannot be controlled or predicted, and can be utilized to generate a unique digital identifier from the PUF structure. It is highly desirable that the PUF will be very sensitive to these local mismatches to give each element a maximized uniqueness/randomness. At the same time, PVT variations should not affect the PUF output, thus enabling high repeatability and reliability.

In the prior art, a variety of digital circuits have been used to generate PUFs. While these circuits are very sensitive to device variation, they are also vulnerable to noise and environmental effects, such as temperature, supply noise, device noise, etc. This has resulted in a limited reliability of the PUFs and error correction codes have been required to compensate for this, which exposes some of the secure information to the outside world. Among the different types of circuits used to generate PUF include delay lines and ring oscillators, but the most common PUF circuit is the SRAM (static random access memory) PUF.

An example of an SRAM PUF scheme is described in the inventor's U.S. patent application Ser. No. 15/694,809, which is incorporated herein by reference, is shown in FIG. 1A. During normal operation, the voltage supplies Vcc, VccL and VccR are equal. When the cell is disabled, the SRAM latching nodes H and H_b are held at VCC by keeper transistors P2 and P3. A keeper transistor is a transistor which biases a node at a given level in a given state, such as a disable state. In FIG. 1A, P2 and P3 have this function. A virtual VSS, VssV, is generated by N1, and this is the Vss of the two criss-crossed latching inverters, iL and iR. The inverters are connected in a criss-cross or latching manner, such that the input of the first inverter is connected to the output of the second inverter and the input of the second inverter is connected to the output of the first inverter. When the cell is enabled, H and H_b are released and VssV is pulled down to Vss. The logical values of latch are mainly determined by the trip point variation between the two inverters. If there is a substantial amount of variation in a given cell, the latch will always reach the same logic value.

However, a problem can exist: If the variation is small, the logical value will be determined by noise, and can vary from run to run. In this case the bit is unstable and the PUF value from this bit is unreliable. In addition, this trip value for unstable bits can vary as a function of process, voltage and temperature conditions. Given no correction technique, 30% of the SRAM bits can be unstable (S. Mathew, et. al. "A 0.19 pJ/b PVT-Variation-Tolerant Hybrid Physically Unclonable Function Circuit for 100% Stable Secure Key Generation in 22 nm CMOS" in *ISSCC* 2014, *Digest of Technical Papers*, pp. 278). A temporal majority voting (TMV) method is suggested by Mathew in which 20 multiple runs are done and bits which wake up in the same state 75% of the time are deemed valid. In addition, burn-in methods are used to solidify existing variation paths. Between these two techniques, 10% of the array has unstable bits. Then extensive testing can be done at different voltages and temperature to identify unstable bit. In addition Error correction codes are then used to make the PUF viable. The unstable bits can be masked by fusing or in the trusted environment and the algorithm can be implemented with the stable bits and error correction codes. However, the error correction code exposes some information to the outside world and is thus less secure.

A transient noise simulation of an unstable bit in the prior art is shown in FIG. 1B, which consists of 100 orthogonal noise runs. During the initialization, both H and H_b are held at Vcc. When the PUF cell is enabled, P2 and P3 release these nodes and they are both pulled towards Vss. The signals H or H_b then reach a decision voltage (roughly Vcc/2) where the inverters are at their trip point and then start to diverge, either to 0V or Vcc. Based on the noise and random variations in the bit, the latch can wake up in either state. If the random variation is large, the cell will consistently wake up in the same state. For this unstable cell shown in FIG. 1B, the noise dominates and the cell can wake up in either state, which can present a reliability problem.

The tilting method disclosed in U.S. patent application Ser. No. 15/694,809 imposed a small voltage difference, Delta, between VccL and VccR, during a calibration step. This caused bits which are unstable to be tilted either towards a zero or a one. FIG. 1C shows unstable bits in 100 noise runs. When Delta is negative, the bits are pushed towards a logic 1 state, and when Delta is positive, they are pushed towards a logic zero. The calibration step imposes positive and negative Delta's on the array, and any bit which does not change its state is deemed stable, and the unstable bits can be identified and disqualified, resulting in a 100% stable array without ECC. The tilting calibration can also be done at one Vcc and temperature level, which also saves testing cost.

SUMMARY OF THE INVENTION

One of the problems with the prior-art tilting method is that the method requires analog control of the voltages VccL and VccR. This can be done off-chip, but this requires package pins and routing which is expensive. It is also possible to do it on chip, but that requires a reference voltage as well as voltage regulators, which add cost and complexity to the system. The present invention provides a new tilting method which is purely digital, and thus simpler and cheaper. In addition, the method increases the amount of PUF cells in the array by making the cells two or more bits/cell.

The present invention seeks to provide an improved technique and improved circuitry which enable the SRAM PUF to have more than one bit per cell which saves silicon area and cost. The invention utilizes a purely digital tilting technique to eliminate unstable bits. This can drastically reduce or even eliminate the need for error correction codes (ECC), which makes the PUF array more secure.

In the prior-art voltage tilting U.S. patent application Ser. No. 15/694,809, analog voltage were used in order to identify unstable cells. While this technique is effective, it has a limitation that it requires precision analog voltages during the calibration stage, which are not usually available to the customer who is recording the PUF data into the trusted environment. It is possible to implement on-die regulators, but these cost significant area, power, complexity, etc. In the present invention, the tilting method is purely digital and can effectively identify unstable bits without the analog overhead.

BRIEF DESCRIPTION OF THE DRAWINGS

The present invention will be understood and appreciated more fully from the following detailed description taken in conjunction with the drawings in which.

DETAILED DESCRIPTION

Figure 1A:
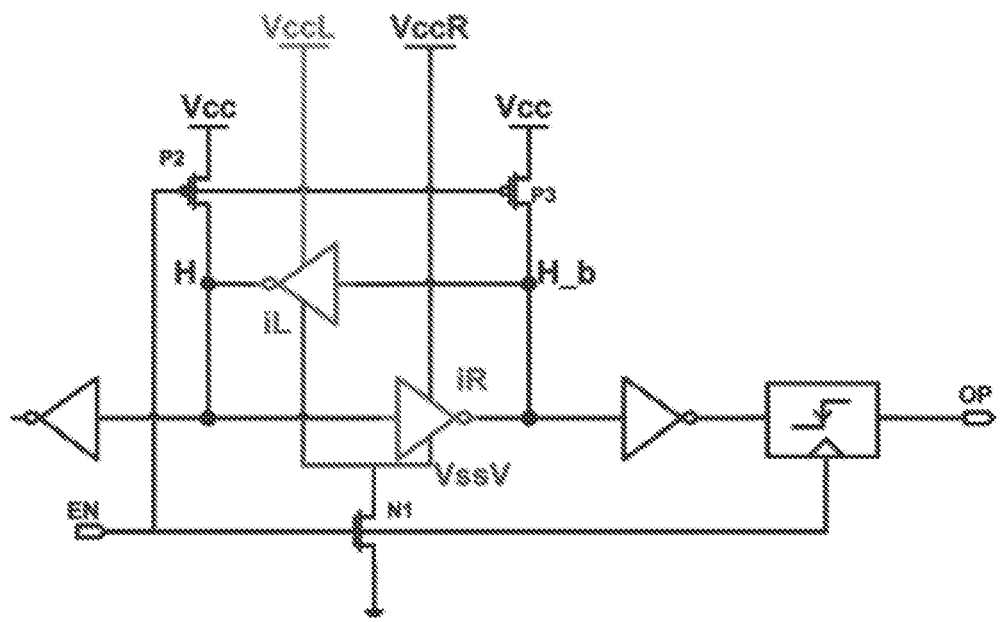
FIG. 1A is a circuit diagram of a prior art SRAM PUF.
Figure 1B:
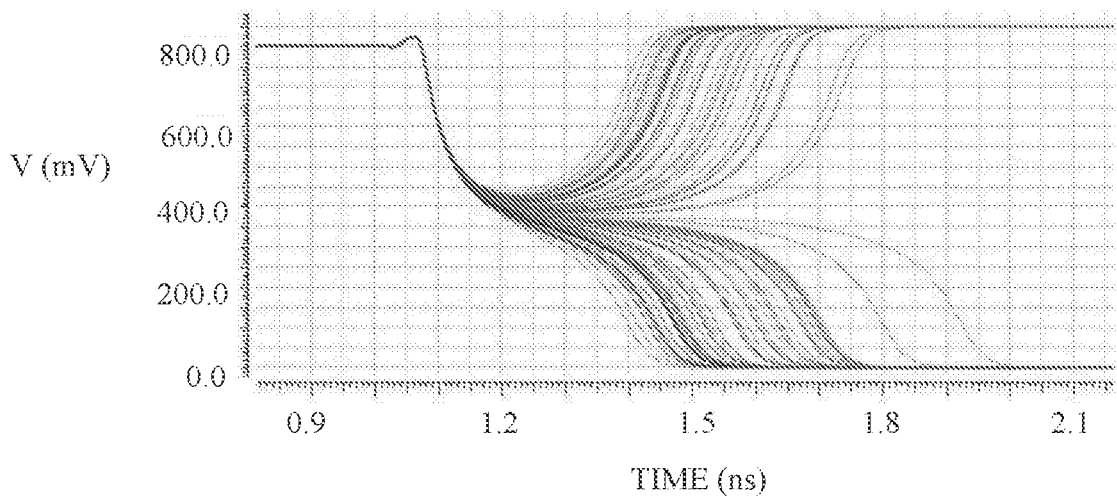
FIG. 1B is a graphical diagram of a transient noise simulation of a prior art unstable SRAM PUF bit after enable.
Figure 1C:
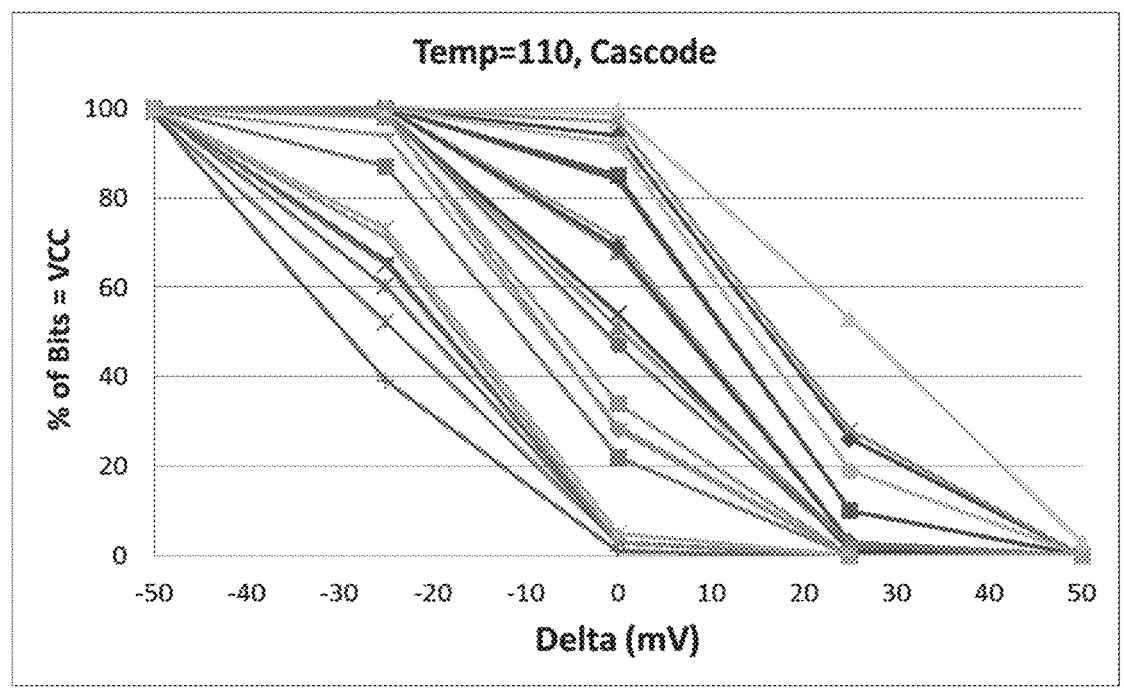
FIG. 1C is a graphical illustration of prior art simulations of unstable bits using tilting for high gain cell (Vcc=0.8, Temp=110, high gain cell (Cascoded PUF)–500 Splits)
Figure 1D:
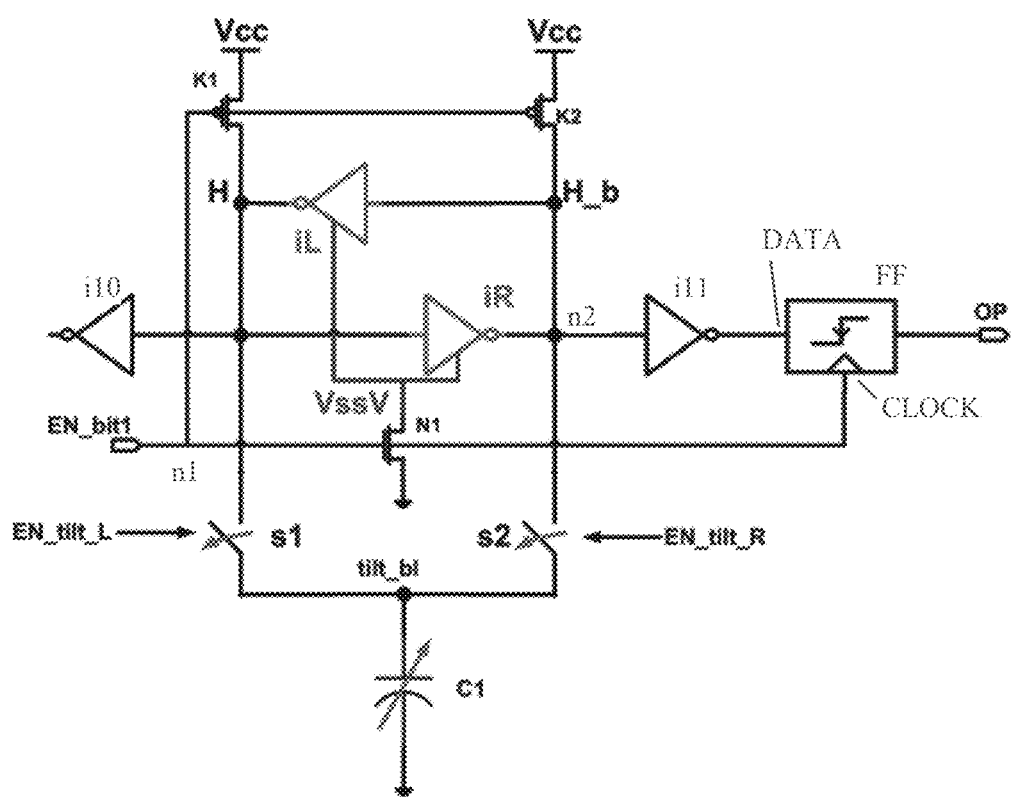
FIG. 1D is a circuit diagram of a circuit and method for detecting unreliable bits, by using digital PUF tilting to detect unreliable bits in calibration or in the field, in accordance with a non-limiting embodiment of the present invention.

The non-limiting circuitry of FIG. 1D is now described. In general, throughout the specification and claims, the term "connected" means a direct electrical connection between the things that are connected, without any intermediary devices. The term "coupled" means either a direct electrical connection between the things that are connected or an indirect connection through one or more passive or active intermediary devices. The term "circuit" or "circuitry" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on." For purposes of the embodiments, the transistors are metal oxide semiconductor (MOS) transistors, which include drain, source, gate, and bulk terminals, but the transistors may include any device implementing transistor functionality, such as without limitation, bi-polar junction transistors—BJT PNP/NPN, BiCMOS, CMOS, eFET, etc. Note that the inverter elements shown in the schematics have an input and an output which are shown explicitly in the schematic, but there is also implied a positive supply terminal (Vcc) and a negative supply terminal (Vss) of the inverters. When the negative and positive supply terminals are not connected to anything, it is implied that the negative supply terminal is connected to Vss, the negative supply, while the positive supply terminal is connected to Vcc, the positive supply, as is known in the art. Some of the schematics show connections of the implied negative and positive supply terminals to different supplies.

In the circuitry of FIG. 1D, input logic signal EN_bit1 is coupled via a node n1 to a gate terminal of an NMOS transistor N1 and to a gate terminal of a PMOS transistor K1, and to a gate terminal of a PMOS transistor K2 (the gates of the PMOS transistors K1 and K2 are coupled to each other). A source terminal of the PMOS transistor K1 is coupled to a voltage source Vcc, and a drain terminal of the PMOS transistor K1 is coupled to a node H and from there to an output of an inverter iL and to an input of an inverter iR. A source terminal of the NMOS transistor N1 is coupled to ground and a drain terminal of the NMOS transistor N1 is coupled to a voltage source VssV and from there to a negative supply (Vss) terminal of inverter iR. An input of inverter iR is coupled to an input of an inverter i10. The inverter iR outputs to an input of another (buffer) inverter i11 via a node n2. An output of inverter i11 is connected to a data terminal of a logic element (e.g., a flip-flop) FF, which may be used to record data and which outputs to output OP. The EN_bit1 signal is connected to a clock terminal of the FF. A VSS terminal of the inverter iL is coupled to the voltage source VssV. An input of inverter iL is coupled to a node H_b and from there coupled to an input of inverter i11 via the node n2. A source of the PMOS transistor K2 is coupled to the voltage source Vcc and a drain of the PMOS transistor K2 is coupled to the node H_b. The PMOs transistors K1 and K2 are keeper transistors.

A first switch S1 having a first phase is coupled to the node H and to a node tilt_b1 (tilt bitline). A second switch S2 having a second phase is coupled to the node H_b and to the node tilt_b1. An adjustable capacitor C1 is coupled to the node tilt_b1 and is grounded. The first switch S1 receives an input logic signal EN_tilt_L and the second switch S2 receives an input logic signal EN_tilt_R. The capacitance of C1 can be adjusted by digital bits or by any other technique.

The circuit of FIG. 1D uses digital tilting. Instead of strengthening or weakening one side with respect to the other using the supply voltages, the capacitor C1 can be added to either side via the switches S1 and S2. Each of the switches connect H or H_b to the tilt bitline, tilt_b1, and C1 is coupled to tilt_b1. As shown in the schematic, when EN_tilt_L is asserted, C1 is coupled to the left side, while when EN_tilt_R is asserted, C1 is coupled to the right side. This imbalance has a similar effect as the voltage tilting in the prior art, but does not require any costly analog voltages. The switches S1 and S2 can be implemented using NMOS or PMOS devices, as well as transfer gates. The PUF of FIG. 1D can optionally contain a Miller capacitor between H and H_b to reduce the noise.

Figure 1E:
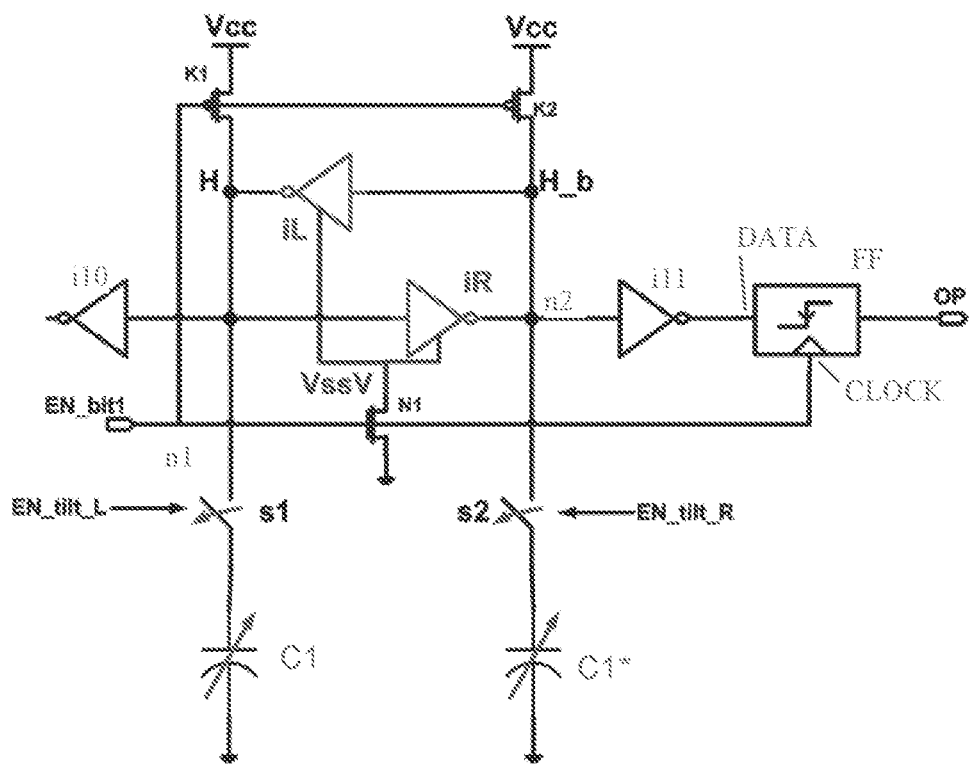
FIG. 1E is a circuit diagram of a circuit and method for detecting unreliable bits, by using digital PUF tilting to detect unreliable bits in calibration or in the field, in accordance with another non-limiting embodiment of the present invention.

FIG. 1E illustrates a second embodiment of the invention, in which two capacitors C1 are used and they are not shared between the left and right sides of the PUF. This embodiment uses slightly more area, but eliminates any parasitic coupling effects between the two sides.

Specifically the circuitry of FIG. 1E is the same as described for FIG. 1D, except that first switch S1 is coupled to the node H and to a first capacitor C1, which is grounded; second switch S2 is coupled to the node H_b and to a second capacitor C1*, which is grounded.

Figure 2:
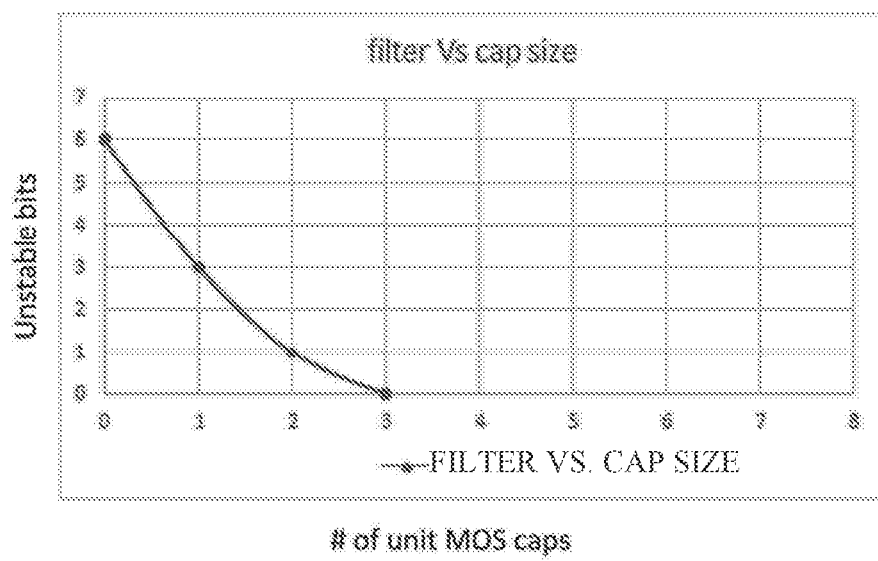
FIG. 2 is a graphical diagram of the percentage of unstable bits in an array vs. unit cap size for PUF of FIG. 1E.

FIG. 2 illustrates the effect of the tilting of the capacitor C1 on the amount of unstable bits in the array. The percentage of unstable bits is plotted against the number of unit capacitors (in the adjustable capacitor C1). As the number of capacitors increases, the number of unstable bits is reduced after the calibration step.

Figure 3:
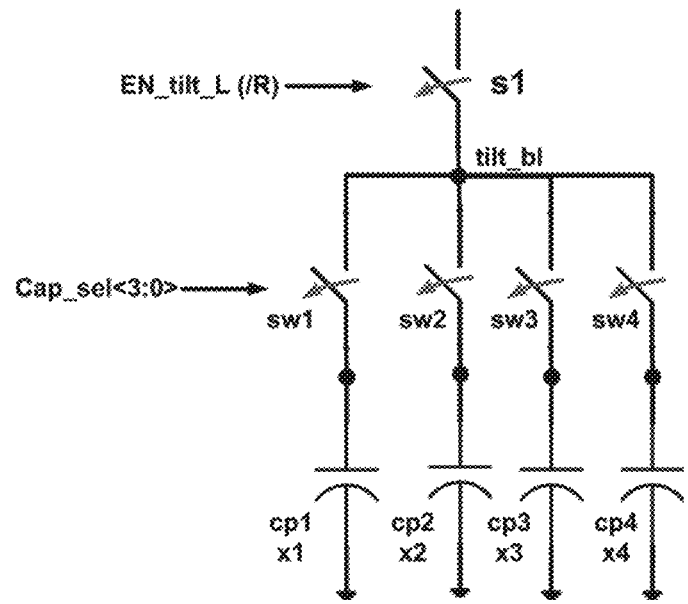
FIG. 3 is a circuit diagram of an implementation of a digitally controllable capacitor, in accordance with a non-limiting embodiment of the present invention.

As described above, that capacitors C1 can variable capacitors, which can be controlled by digital trims. One embodiment of controlling (adjusting) each capacitor is shown in FIG. 3. Here there are an additional array of switches each coupled to a different capacitor, which can optionally be scaled to X, 2X, 4X, etc. to provide a large range of potential capacitance. This can be any type of capacitor available in the CMOS process.

In the circuit of FIG. 3, each switch (sw1, sw2, sw3, sw4, etc.) is coupled between the node tilt_b1 and a corresponding capacitor (cp1, cp2, cp3, cp4, etc., respectively) and all capacitors are grounded. The node tilt_b1 is coupled to the switch s1, which receives the input EN_tilt_L (or R) as before.

Figure 4:
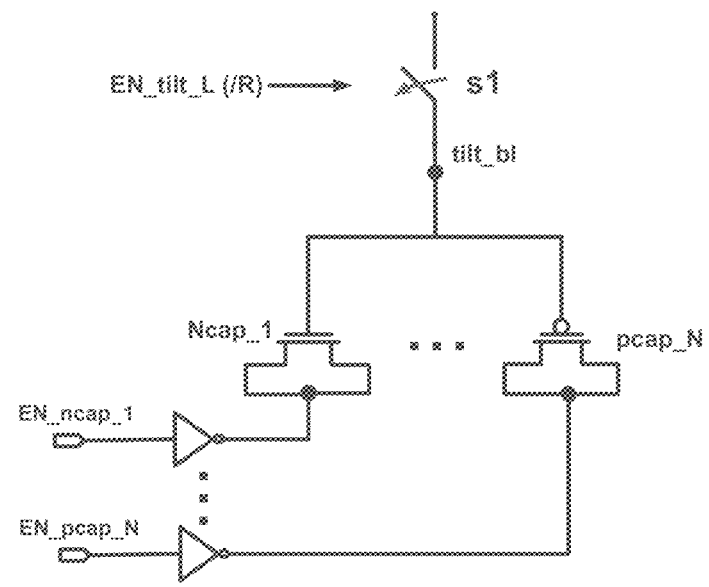
FIG. 4 is a circuit diagram of an MOS version of a digitally controllable capacitor, in accordance with a non-limiting embodiment of the present invention.

Another embodiment of C1 is shown in FIG. 4, which is the preferred embodiment. Here the capacitor is implemented using an array of NMOS and/or PMOS devices (in the figure, NMOS capacitor Ncap_1 ... PMOS capacitor Pcap_N). The gate of the device is coupled to the tilt_b1 and the source or drain is connected to the logic signal (EN_ncap_1 ... EN_pcap_N) which can place them at Vcc or Vss. This capacitor takes advantage of the fact that the MOS devices have very different gate capacitances if they are biased in inversion or accumulation. For example, if EN_ncap_1 is asserted, then the source/drain of Ncap_1=0 V and when the tilt_b1 is at the decision voltage of the PUF Ncap_1 will have sufficient Vgs bias to be in inversion and will have a relatively large gate capacitance. If EN_Ncap_1=0, then the source/drain of Ncap_1=Vcc, and it will be in accumulation at the decision voltage (generally Vcc/2), with a much lower capacitance. The advantage of this approach compared to FIG. 3 is that it saves the switches of the capacitors. The inverters driving the source/drain voltages can be shared among many bits. If one uses the embodiment shown in FIG. 1E where each side gets its own capacitor bank, then it is not necessary to have switches at all. Since the capacitors are minimum sized devices, they will add negligible area to the PUF.

Figure 5:
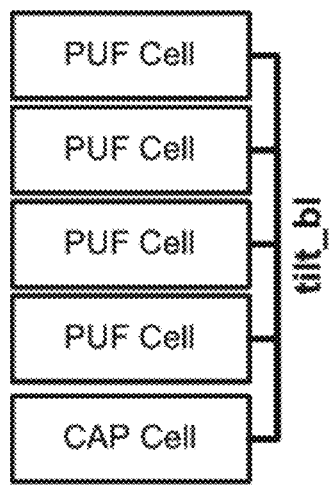
FIG. 5 is a block diagram of sharing in a capacitor array among several PUF cells.

It is not necessary to have the tilting capacitors present in each bit, and they can be shared among several bits to save area. This is shown in FIG. 5. Each of the shared bits is calibrated separately. However, since the calibration step is done only once in the lifetime of the chip and is fairly short, this does not represent a significant constraint.

A second aspect of this invention is the capability to implement two or more bits per cell and increase the density of the PUF array. As will be explained, the digital tilting method is more appropriate for this type of cell than analog.

Figure 6:
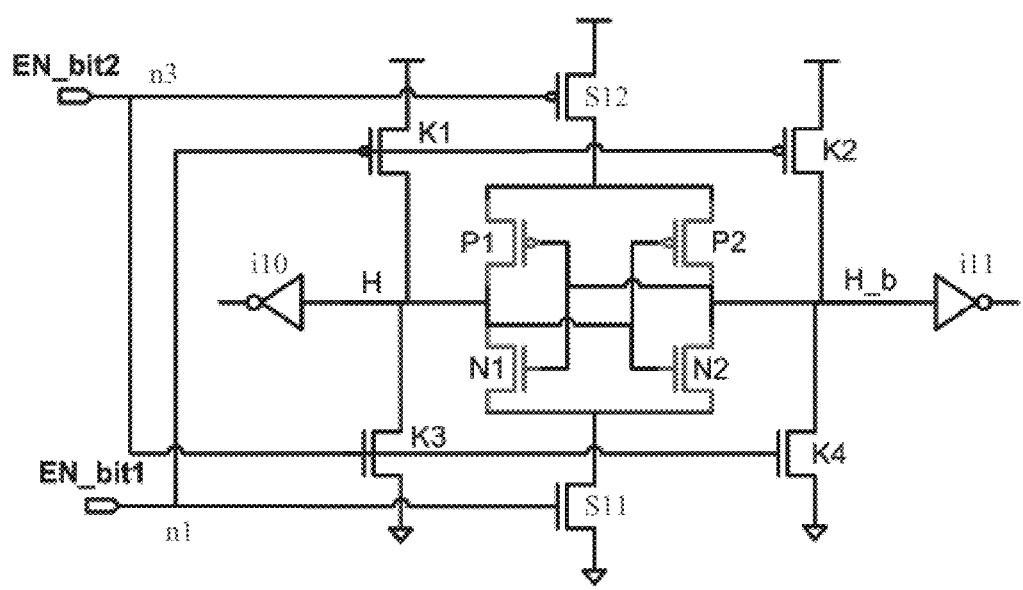
FIG. 6 is a circuit diagram of a two-bit/cell PUF which uses orthogonal NMOS and PMOS variation for the PUF, in accordance with a non-limiting embodiment of the present invention.

FIG. 6 illustrates a two bit/cell PUF. For this PUF, three additional transistors are added compared to the standard PUF (S12, K3 and K4). During certain controlled conditions in the PUF, the variations of the NMOS devices in the latch (N1 and N2) can be orthogonal to the PMOS devices (P1, P2). The NMOS devices can be a first bit (bit1), while the PMOS devices can be a second bit (bit 2).

In the circuit of FIG. 6, input logic signal EN_bit1 is coupled via the node n1 to a gate terminal of an NMOS transistor S11 and to the gate terminal of the PMOS transistor K1, and to the gate terminal of the PMOS transistor K2 (the gates of the PMOS transistors K1 and K2 are coupled to each other). A source of the NMOS transistor S11 is grounded and a drain of the NMOS transistor S11 is coupled to sources of NMOS transistors N1 and N2. An input logic signal EN_bit2 is coupled via a node n3 to a gate terminal of a PMOS transistor S12. A source of the PMOS transistor S12 is coupled to Vcc and a drain of the PMOS transistor S12 is coupled to sources of PMOS transistors P1 and P2. Drains of the NMOS transistor N1 and the PMOS transistor P1 are coupled to each other at node H, and are coupled to the gates of N2 and P2. Drains of the NMOS transistor N2 and the PMOS transistor P2 are coupled to each other at node H_b and to the gates of P1 and N1. The source terminal of the PMOS transistor K1 is coupled to the voltage source Vcc, and the drain terminal of the PMOS transistor K1 is coupled to the node H and from there to the input of the inverter HO and to the drains of the NMOS transistor N1 and the PMOS transistor P1. The source terminal of the PMOS transistor K2 is coupled to the voltage source Vcc, and the drain terminal of the PMOS transistor K2 is coupled to the node H_b and from there to the input of the inverter i11 and to a drain of an NMOS transistor K4. A source of the NMOS transistor K4 is grounded and a gate of the NMOS transistor K4 is coupled to the logic signal EN_bit2 via the node n3.

A source of NMOS K3 is coupled to GND and a gate of K3 is coupled to EN_bit2, while a drain of K3 is coupled to node H.

Figure 7:
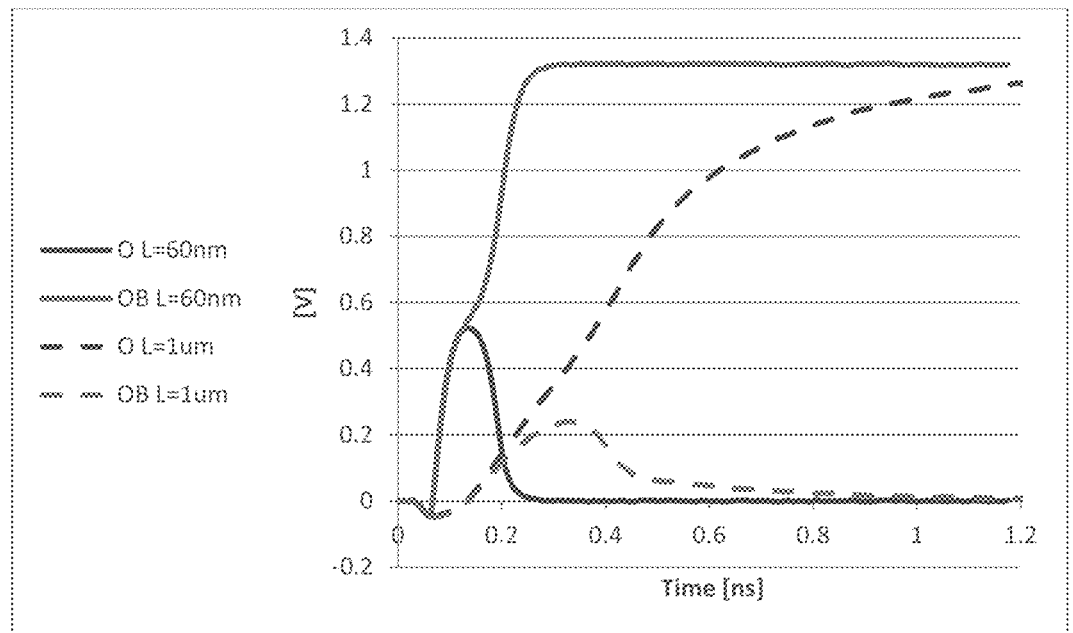
FIG. 7 is a graphical diagram of a simulation of Bit 2 of FIG. 6, wherein the solid curves have the PMOS device S12 as a strong device (L=60 nm), while dashed curves have the PMOS device S12 as a weak device.

FIG. 7 illustrates the decision voltage point of bit2 after it is enabled. The decision voltage is the point at which the two sides of the latch start to diverge, and this determines whether the cell is a logic 0 or 1. The solid curves show H and H_b when the enabling switch S12 is a fairly strong device. The decision voltage occurs at roughly 0.5V. At this level, the PMOS devices have a Vgs of 0.8V (Vcc=1.3) and the NMOS devices have a Vgs of 0.5. Since the PMOS have a much greater Vgs, they will have a greater influence on the outcome, but the influence of the NMOS is still present. The dashed curves in FIG. 7 show the same bit when the enabling switch S12 is a weak device. In this case, the ramp is a bit slower and the decision voltage occurs at 0.1-0.2 V. At this voltage, the Vgs of the NMOS is below Vth, and the NMOS devices are completely off and do not contribute at all to the variation of the PUF. Thus, the two sides of the PUF can be initialized at Vcc or Vss and pulled in the opposite direction. Since the NMOS and PMOS variations are orthogonal to each other, and each bit can be made to use only one of them, the two bits can be completely orthogonal. For this to occur, the switches S11 and S12 need to be relatively weak devices. This can be done by reducing their W/L ratio, or by applying an analog bias (not full Vcc) to the gate when they are enabled, as is known in the art. The addition of the three extra transistors adds a small amount of area (~30%) to the PUF primitive, but enables a second bit. If one takes into account that most PUFs also contain a lot of logic and a flip-flop, the area addition of the second bit can be Irss than 10%.

Figure 8:
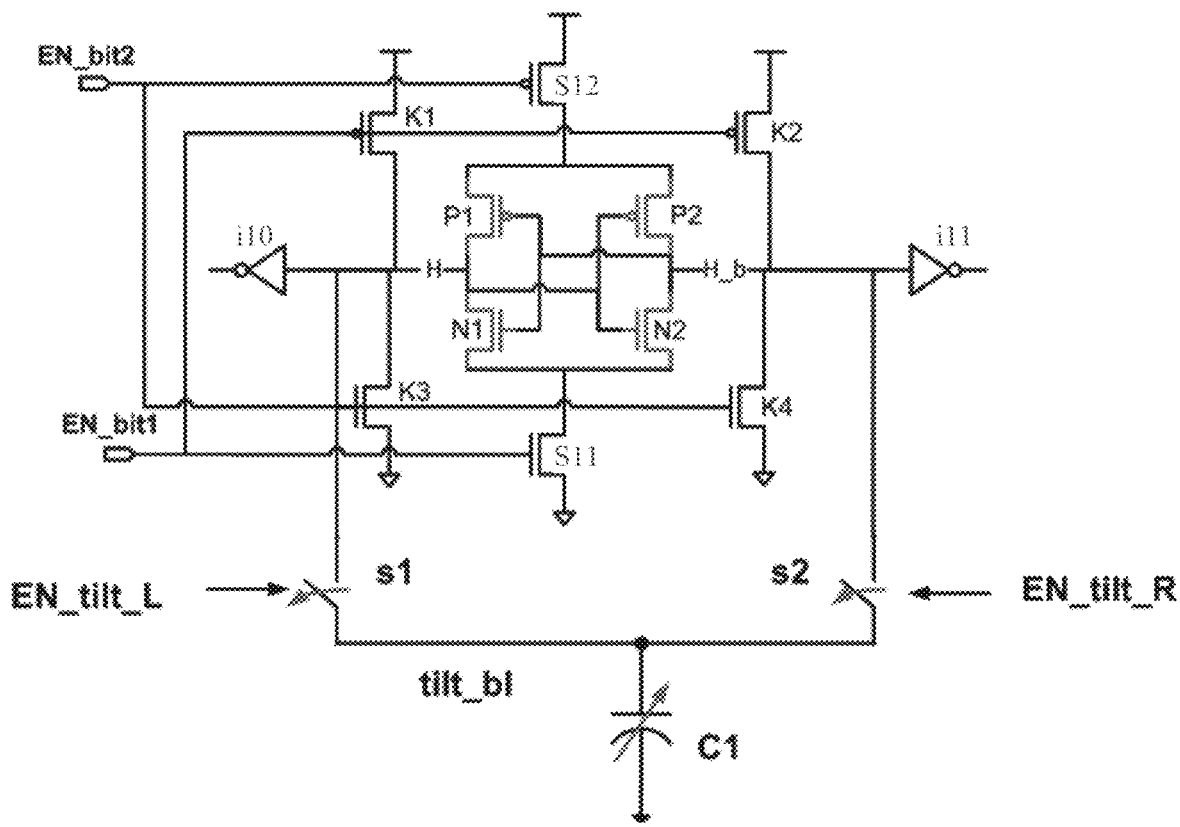
FIG. 8 is a circuit diagram of a two-bit/cell PUF with a tilting capacitor implementation, in accordance with a non-limiting embodiment of the present invention.

For the two bit/cell PUF, the use of the supply based tilting in the prior art is inappropriate since the supply voltages of the latch (N1, N2, P1, P2) are internal to the cell. However, the present digital tilting method can be implemented, as shown in FIG. 8. The switches S1 and/or S2 connect the two sides of the PUF to the tilt_b1 to enable tilting.

Specifically, the circuit of FIG. 8 is that of FIG. 6 with the following addition: The first switch S1 is coupled to the node H and to the node tilt_b1 (tilt bitline). The second switch S2 is coupled to the node H_b and to the node tilt_b1. The adjustable capacitor C1 is coupled to the node tilt_b1 and is grounded. The first switch S1 receives an input logic signal EN_tilt_L and the switch S2 receives an input logic signal EN_tilt_R.

Figure 9:
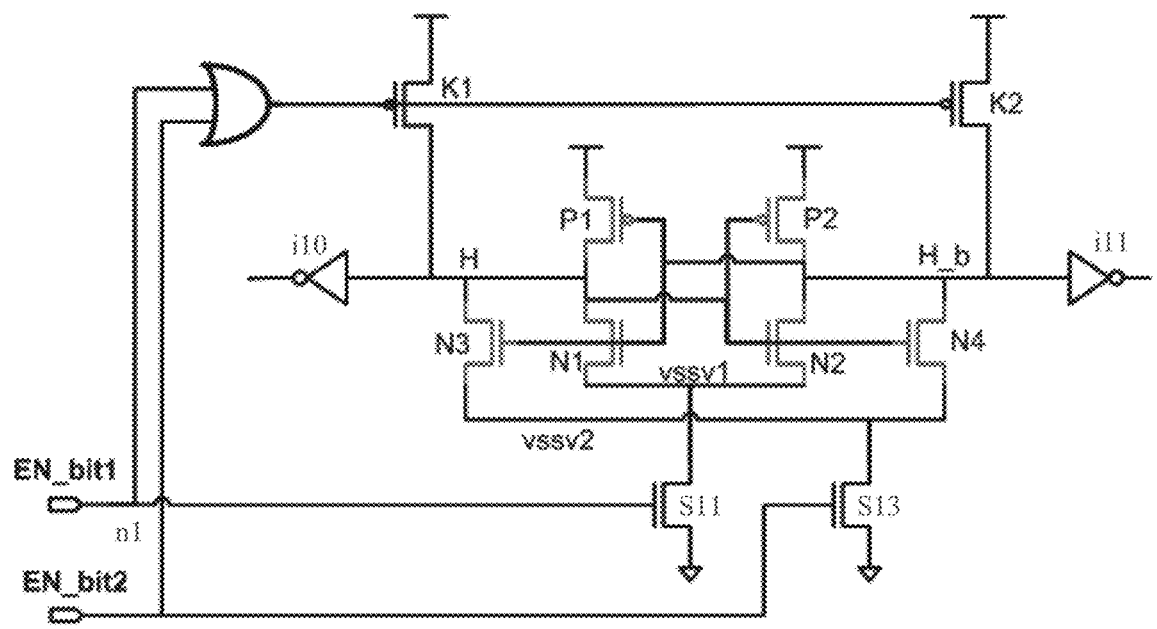
FIG. 9 is a circuit diagram of an alternative embodiment of the two bit/cell PUF, which uses only NMOS devices for the variation, in accordance with a non-limiting embodiment of the present invention.

Another implementation of a two bit/cell PUF, which uses mainly NMOS variation for the PUF is shown in FIG. 9.

In the circuit of FIG. 9, input logic signal EN_bit1 is coupled via the node n1 to the gate terminal of the NMOS transistor S11 and to one input of an OR gate. The input logic signal EN_bit2 is coupled to a gate terminal of an NMOS transistor S13 and to the other input of the OR gate. The output of the OR gate is coupled to the gate terminal of the PMOS transistor K1, and to the gate terminal of the PMOS transistor K2 (the gates of the PMOS transistors K1 and K2 are coupled to each other). The source of the NMOS transistor S11 is grounded and the drain of the NMOS transistor S11 is coupled to a voltage source VSSv1, which is coupled to the sources of the NMOS transistors N1 and N2. The source of the NMOS transistor S13 is grounded and the drain of the NMOS transistor S13 is coupled to a voltage source VSSv2, which is coupled to sources of NMOS transistors N3 and N4. Drains of the NMOS transistor N1 and the PMOS transistor P1 are coupled to each other at node H, while the gates of N1 and P1 are both coupled to node H_b. Drains of the NMOS transistor N2 and the PMOS transistor P2 are coupled to each other at node H_b while gates of N2 and P2 are coupled to node H. The sources of the PMOS transistors P1 and P2 are each coupled to the voltage source Vcc. The source terminal of the PMOS transistor K1 is coupled to the voltage source Vcc, and the drain terminal of the PMOS transistor K1 is coupled to the node H and from there to the input of the inverter HO and to the drains of the NMOS transistor N1 and the PMOS transistor P1. The drain of the NMOS transistor N3 is coupled to the node H and the gate of the NMOS transistor N3 is coupled to the gate of the NMOS transistor N1. The source terminal of the PMOS transistor K2 is coupled to the voltage source Vcc, and the drain terminal of the PMOS transistor K2 is coupled to the node H_b and from there to the input of the inverter i11 and to the drain of the NMOS transistor N4. The gate of the NMOS transistor N4 is coupled to the gate of the NMOS transistor N2.

Thus in the circuit of FIG. 9, an additional set of NMOS latching transistors are added (N3, N4). Bit 1 uses N1 and N2 as the latching transistors and N3 and N4 are disabled, while bit 2 uses N3 and N4 in the latch while N1 and N2 are disabled. When either one of the bits is enabled, the keeper transistors, PMOS transistors K1 and K2 are made non-conducting, and nodes H and H_b are pulled down towards the decision voltage. The switches S11 and S13 need to be weak so that the decision voltage will occur when the PMOS transistors P1 and P2 have Vgs<Vth, and thus do not contribute to the variation. This way the PUF's decision is only determined by the NMOS and the two bits are orthogonal. The OR gate to disable the keeper transistors K1 and K2 can be shared among many cells, so its area addition is negligible.

Figure 10:
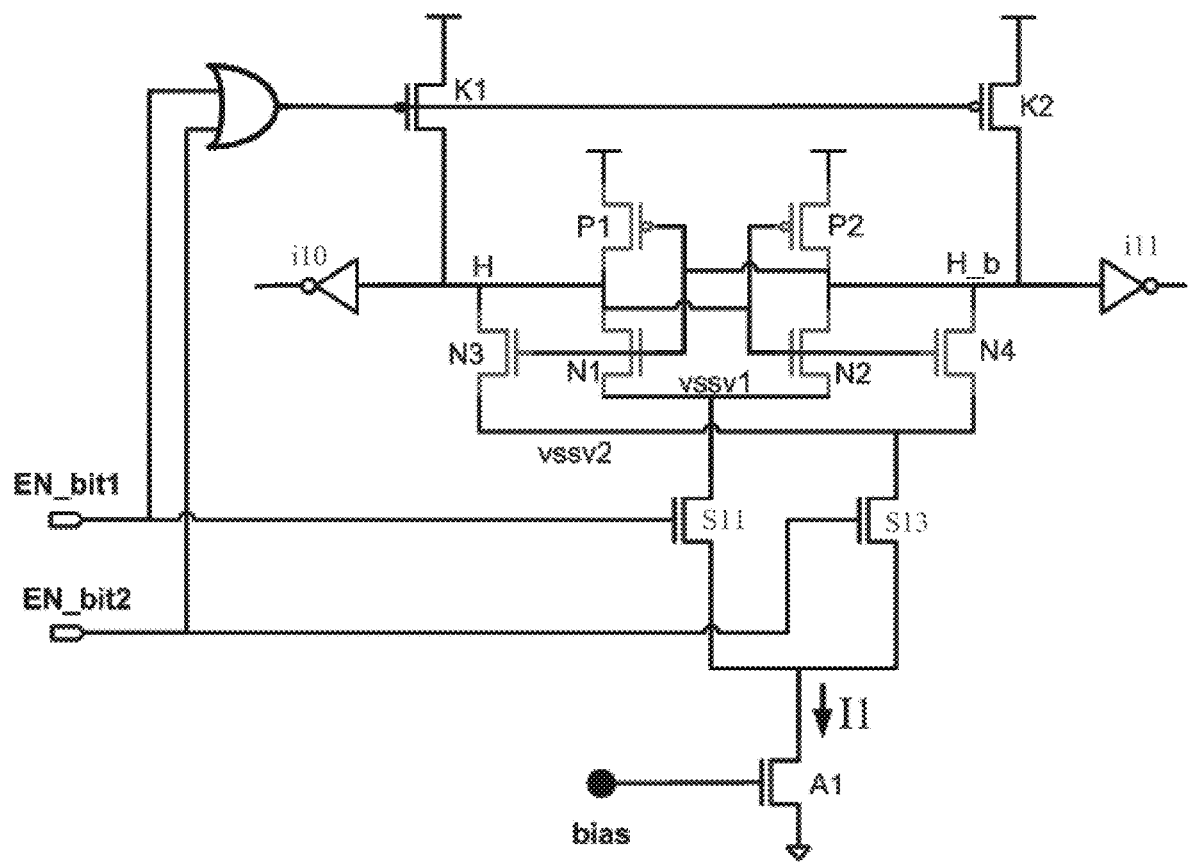
FIG. 10 is a circuit diagram of an alternative embodiment of the two bit/cell which uses only NMOS transistors for the variation and a current source A1 is included to provide slower ramp rates, in accordance with a non-limiting embodiment of the present invention.

Another version of the NMOS variation two bit/cell PUF is shown in FIG. 10. This figure is almost identical with FIG. 9, except that the sources of the NMOS switches S11 and S13 are coupled to a drain of an NMOS current source A1. The gate of the NMOS current source A1 is coupled to a bais and the source of the NMOS current source A1 is grounded.

The current source A1 is controlled by the central bias which is available to many cells. When S11 (or S13) is enabled, the current is steered in its direction and the nodes H and H_b are pulled down in a slower, more controlled fashion. This will cause the decision voltage to occur close to Vcc, which will eliminate the effects of the PMOS transistors P1 and P2, so that the two NMOS-based bits can be fully orthogonal.

It should be noted that the tilting capacitors could be applied to the NMOS two bit/cell PUF (FIGS. 9 and 10) similarly to the NMOS/PMOS version of FIG. 8. In addition, any of the types of capacitors previously explained may be applied to all of them.

The invention claimed is:

1. A method for detecting unreliable bits in transistor circuitry comprising:
    adjusting a value of a variable capacitor coupled to a physical unclonable function (PUF) cell of a transistor circuit, wherein the adjusting comprises tilting the PUF cell to either a zero or one state, and if said PUF cell changes its state during the tilting it is deemed unstable, and if the PUF cell does not change its state during the tilting it is deemed stable.

2. The method according to claim 1, wherein adjusting the value of said variable capacitor is adjusted digitally.

3. The method according to claim 1, wherein said variable capacitor is coupled to said PUF cell via a switch.

4. The method according to claim 1, wherein said PUF cell comprises an SRAM (static random-access memory) PUF.

5. The method according to claim 4, wherein said SRAM PUF comprises two crisscrossed inverters, wherein a first inverter has its input coupled to a node H and its output coupled to a node H_b, and a second inverter has its input coupled to the node H_b and its output coupled to the node H.

6. The method according to claim 5, wherein said variable capacitor is coupled to the node H via a first switch and is coupled to the node H_b via a second switch, or said variable capacitor comprises a first variable capacitor coupled to the node H via said first switch and a second variable capacitor coupled to the node H_b via said second switch.

7. The method according to claim 6, wherein the first and second capacitors are coupled to multiple PUF cells via switches.

8. The method according to claim 5, wherein a first keeper transistor is coupled between the node H and a voltage Vcc and a second keeper transistor is coupled between the node H_b and the voltage Vcc, and a voltage VssV is coupled to a Vss terminal of both crisscrossed inverters by an NMOS transistor N1.

9. The method according to claim 1, wherein said variable capacitor comprises a MOS capacitor whose gate is coupled to an internal node of the PUF cell and whose capacitance is controlled by adjusting a voltage at a source and a drain of the MOS capacitor.

10. A circuit comprising:
a static random-access memory (SRAM) PUF cell having two or more bits per cell and which comprises two crisscrossed inverters, wherein a first inverter has its input coupled to a node H and its output coupled to a node H_b, and a second inverter has its input coupled to the node H_b and its output coupled to the node H, and the nodes H and H_b are initialized to either Vss or Vcc, wherein a voltage VssV1 is provided by a first NMOS switch and Vss terminals of said crisscrossed inverters are coupled to said voltage Vssv1, and another voltage Vssv2 is provided by a second NMOS switch, and an NMOS transistor N3 has a gate coupled to the node H_b and a source coupled to the voltage VssV2 and a drain coupled to the node H, and a third NMOS transistor has a gate coupled to the node H, a source coupled to the voltage VssV2 and a drain coupled to the node H_b.

11. The circuit according to claim 10, wherein at least one current source is coupled to a source of said first NMOS switch and/or a source of said second NMOS switch.

12. The circuit according to claim 10, wherein a tilting technique is applied to the PUF cell to determine which bits are unstable.

13. The circuit according to claim 12, wherein the tilting is done by coupling a variable capacitor to at least one internal node of the PUF cell.

* * * * *